(12) United States Patent
Mitterreiter

(10) Patent No.: US 8,664,944 B2
(45) Date of Patent: Mar. 4, 2014

(54) ANGLE MEASURING SYSTEM AND METHOD FOR PRODUCING AN ANGLE MEASURING SYSTEM

(75) Inventor: Johann Mitterreiter, Chieming (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 446 days.

(21) Appl. No.: 12/921,539

(22) PCT Filed: Jan. 28, 2009

(86) PCT No.: PCT/EP2009/050935
§ 371 (c)(1),
(2), (4) Date: Sep. 8, 2010

(87) PCT Pub. No.: WO2009/112303
PCT Pub. Date: Sep. 17, 2009

(65) Prior Publication Data
US 2011/0006758 A1    Jan. 13, 2011

(30) Foreign Application Priority Data

Mar. 10, 2008    (DE) .......................... 10 2008 013 377

(51) Int. Cl.
*G01B 7/14*    (2006.01)

(52) U.S. Cl.
USPC .............. 324/207.2; 324/207.15; 324/207.11; 324/207.21; 324/173; 324/252; 384/564; 384/448; 73/862.332

(58) Field of Classification Search
USPC ............... 324/205.15, 207.2, 207.21–207.22, 324/173, 252; 384/564, 448; 73/302, 306, 73/229
See application file for complete search history.

(56) References Cited

U.S. PATENT DOCUMENTS

| | | | |
|---|---|---|---|
| 4,406,939 A | | 9/1983 | Golker |
| 5,130,650 A | * | 7/1992 | Lemarquand ............ 324/207.22 |
| 6,118,271 A | * | 9/2000 | Ely et al. ................. 324/207.17 |
| 6,535,135 B1 | * | 3/2003 | French et al. ................ 340/682 |

(Continued)

FOREIGN PATENT DOCUMENTS

| | | |
|---|---|---|
| DE | 30 36 005 | 5/1982 |
| EP | 1 130 362 | 9/2001 |

(Continued)

OTHER PUBLICATIONS

International Search Report, issued in corresponding International Application No. PCT/EP2009/050935.

(Continued)

*Primary Examiner* — Tung X Nguyen
*Assistant Examiner* — Thang Le
(74) *Attorney, Agent, or Firm* — Kenyon & Kenyon LLP

(57) ABSTRACT

An angle measuring system includes a first component group and a second component group, the first component group being mounted in a manner allowing rotation about an axis relative to the second component group. The first component group includes a ring having a running surface and an angle scaling. The second component group has a further ring having a further running surface, as well as a sensor for scanning the angle scaling. Rolling elements are arranged between the running surfaces, the angle scaling being applied such that a geometric pattern of the angle scaling in a first region differs from a geometric pattern of the angle scaling in a second region as a function of radial runouts of the running surfaces and/or of the rolling elements.

16 Claims, 3 Drawing Sheets

(56) References Cited

U.S. PATENT DOCUMENTS

| | | | |
|---|---|---|---|
| 6,570,751 | B2 | 5/2003 | Iwamoto et al. |
| 7,019,515 | B2 * | 3/2006 | Sentoku ................... 324/207.25 |
| 7,686,516 | B2 * | 3/2010 | Shibasaki et al. ............ 384/448 |
| 7,705,587 | B2 * | 4/2010 | Legrand et al. ........... 324/207.25 |
| 7,741,838 | B2 * | 6/2010 | Takahashi et al. ............ 324/160 |
| 7,928,725 | B2 * | 4/2011 | Takahashi ............... 324/207.25 |
| 2004/0066187 | A1 * | 4/2004 | Schroter et al. .......... 324/207.22 |
| 2005/0231315 | A1 * | 10/2005 | Sentoku ........................ 335/302 |
| 2006/0002644 | A1 * | 1/2006 | Mitsue et al. ................. 384/448 |
| 2006/0278022 | A1 * | 12/2006 | Ono ........................ 73/862.322 |
| 2009/0058400 | A1 * | 3/2009 | Isobe et al. ................. 324/207.2 |

FOREIGN PATENT DOCUMENTS

| | | |
|---|---|---|
| EP | 1 291 660 | 3/2003 |
| JP | 09-042994 | 2/1997 |
| JP | 2002-318239 | 10/2002 |

OTHER PUBLICATIONS

Japanese Office Action, mailed Jun. 7, 2013, issued in corresponding Japanese Patent Application No. 2010-550101.

* cited by examiner

ANGLE MEASURING SYSTEM AND METHOD FOR PRODUCING AN ANGLE MEASURING SYSTEM

FIELD OF THE INVENTION

The present invention relates to an angle measuring system and a method for producing an angle measuring system.

BACKGROUND INFORMATION

Such angle measuring systems are used to measure rotary motions and rotational positions of a machine part, for instance, a shaft. The rotary motion is determined either incrementally or absolutely; the output measured value, for example, is a sequence of counting pulses, a counter value or a code word. Corresponding angle measuring systems are used particularly in what are referred to as pick-and-place machines in the manufacture of electronic components, or in machine tools for measuring rotary movements. The reproducibility or repeatability of the rotational angles of machine parts precisely to only a few angular seconds is very important when working with pick-and-place machines, for instance. In particular, the absolute accuracy of the measurement results of an angle measuring system is crucial in the case of machine tools. Certain conventional angle measuring systems have a separate bearing assembly of the component parts rotatable relative to each other.

The accuracy of an angle measurement is influenced by the quality of the angle scaling, its eccentricity and by the radial runouts of the bearing assembly or wobble errors.

German Published Patent Application No. 30 36 005 describes a method for producing an angle scaling for an angle measuring system in which code tracks are applied to a code disk by a laser beam. When being written on, the code disk is already connected to a shaft, so that the code disk is already centered relative to the shaft during the writing of the code pattern.

This method has the disadvantage that the angle measuring systems produced by it do not achieve the highest accuracy, are not sufficiently robust for many applications and moreover, require a relatively great amount of space.

SUMMARY

Example embodiments of the present invention provide a robust angle measuring system and a method for producing it, which provides a very precisely operating, compact angle measuring system in a simple type of construction.

According to example embodiments of the present invention, the angle measuring system includes a first component group, a second component group and a sensor, the first component group being mounted in a manner allowing rotation about an axis relative to the second component group. The first component group features a ring having a running surface and having an angle scaling. The second component group has a further ring having a further running surface and the sensor for scanning the angle scaling. Rolling elements are disposed between the running surfaces of the first and second component groups. The angle scaling is applied such that a geometric pattern of the angle scaling in a first region differs from a geometric pattern of the angle scaling in a second region as a function of radial runouts of the running surfaces and/or of the rolling elements.

The geometric patterns of the angle scaling in the angle measuring system are thus a function, inter alia, of the individual dimensions or dimensional deviations of the respective running surfaces and/or of the rolling elements provided in the angle measuring system.

The angle scaling is applied on a component of the first component group; the component may be connected as a separate component, for instance, as a graduation ring, in rotatably fixed manner to the ring, or else may be implemented as an integral part of the ring of the first component group. The latter is the case, for instance, when the angle scaling is applied directly on the ring.

The ring of the second component group may include a radially traversing opening, through which the angle scaling is able to be applied. The opening may be formed such that it has an axial extension which is less than ⅓, especially less than ⅕, of the axial outside dimension of the ring of the second component group.

Incidentally, the running surfaces are the surfaces or paths along which the rolling elements roll during operation of the angle measuring system. From the paraxial view, the running surfaces of the ring of the first component group may be convex, while the running surfaces of the ring of the second component group may be concave.

According to example embodiments of the angle measuring system, the ring of the first component group is located radially inside and may then also be denoted as inner ring, while the ring of the second component group in this case is located radially outside, and may be defined as outer ring.

For example, the angle scaling is disposed on a lateral side of the graduation ring. The term lateral side should be understood to refer to a cylindrical surface or peripheral area which is either closed around 360° or represents only a part of a peripheral area. The angle scaling may then be aligned with a directional component parallel to the axis.

The angle scaling frequently includes regions having different magnetic polarization. In this case, the magnetized regions are aligned with a directional component parallel to the axis, so that north poles and south poles quasi alternate with each other as magnetic graduation marks in the circumferential direction. In particular, the angle scaling may also include a plurality of tracks, for example, when the absolute angular position of a shaft to be measured is to be ascertainable directly by the angle scaling.

Alternatively or in addition to the substantially axial alignment of the angle scaling, the angle scaling may also be aligned with a radial directional component. In this case, at least a part of the angle scaling is applied on the face of the relevant component of the first component group.

The angle scaling may be applied on a component, particularly a graduation ring, of the first component group, which is made of a magnetizable material. The graduation ring may be made of a magnetically hard material having a coercive field strength of at least 1 kA/m. The coercive field strength is, for example, between 10 kA/m and 60 kA/m, e.g., between 25 kA/m and 45 kA/m.

For example, the sensor used may be an MR sensor or a Hall sensor.

Particularly good measuring accuracies of the angle measuring system are achieved if the first component group and the second component group as well as the rolling elements are arranged such that the first component group and the second component group are disposed so as to be axially and/or radially free from play with respect to each other.

For example, the first and the second component groups, respectively, may have two running surfaces, between which in each case rolling elements are disposed. The angle scaling as well as the opening through which the angle scaling is able to be applied may then be disposed axially between these running surfaces.

According to example embodiments, the ring of the second component group is solid, and in the circumferential direction, offset with respect to the opening, has a first recess for accommodating a printed circuit board having an electronic circuit.

The angle measuring system is implemented so that its maximum axial extension is less than 40%, e.g., less than 30% of the maximum outside radius of the angle measuring system. Furthermore, the angle measuring system may have a relatively large opening for accommodating a shaft to be measured, the radius of the opening being, for example, at least 50%, e.g., at least 60% of the maximum outside radius of the angle measuring system. For example, this opening is bounded by the inside diameter of the inner ring, while the outside radius of the outer ring then represents the outside radius of the angle measuring system.

In the method according to an example embodiment of the present invention, initially the rings of the two component groups are fabricated, in each case at least one finely machined running surface being produced on them. The angle measuring system is thereupon assembled in a manner that the running surface of the first ring is opposite the running surface of the second ring, and the rolling elements are disposed between both running surfaces such that the first component group and the second component group are situated so as to be axially free from play with respect to each other. The rings are later affixed to elements rotatable relative to each other—e.g., a stator block and a shaft—of a scaling machine. In a further operation, the angle scaling is applied on a component of the first component group, in this operation, the rings in the scaling machine being rotated around the axis relative to each other.

For example, an opening, especially radially oriented, is incorporated in the ring of the second component group. The angle scaling is then applied on the relevant component of the first component group using the opening.

The angle scaling may be provided such that only incremental angular-position information is able to be read through it, or else additionally or as an alternative to that, absolute angular positions, as well.

In order to apply an angle scaling which is made up of regions having different magnetic polarization, a magnetic writing head may be introduced into the opening, and the angle scaling may then be applied. For example, the component of the first component group on which the angle scaling is applied is made of a magnetically hard material.

The component, particularly a graduation ring, of the first component group on which the angle scaling is later applied may be mounted on the ring of the first component group during assembly, e.g., before the angle scaling is applied. In particular, the component may be mounted on the outer circumference of the ring.

The running surfaces may be machined with the aid of a grinding, honing or lapping process.

When assembling the first component group, the second component group and the rolling elements, an axial and/or radial prestress may be produced between the rings.

According to example embodiments of the present invention, the angle measuring system includes a first component group and a second component group, the first component group being mounted in a manner allowing rotation about an axis relative to the second component group. Furthermore, the first component group includes a ring having a running surface and an angle scaling. The second component group has a sensor for scanning the angle scaling as well as a printed circuit board having an electronic circuit for evaluating signals of the sensor able to be generated by the scanning. In addition, the second component group includes a solid ring on which a further running surface is situated, and has a first recess for accommodating the printed circuit board. The second component group further has a second recess for accommodating an electrical conductor. The electrical conductor is set apart from the sensor and electrically connects the sensor to the electronic circuit.

An extension of the first recess in the ring of the second component group in a direction parallel to the axis may be greater than an extension of the first recess in the circumferential direction. In particular, the greatest extension of the first recess in a direction parallel to the axis is greater than the greatest extension of the first recess in the circumferential direction.

The ring of the second component group has an axial outside dimension which is, for example, at least 1.5 times as great as the extension of the first recess in the ring of the second component group in a direction parallel to the axis. In particular, the axial outside dimension of the ring in question may be at least 1.75 times or at least 2 times as great as the extension of the first recess in the ring of the second component group in a direction parallel to the axis.

The ring of the second component group may have a third recess for accommodating the sensor. Prior to the assembly—in particular, exclusively prior to the assembly—of the first component group, the second component group and the rolling elements, the sensor may be mounted on the second component group. In particular, the electrical conductor may already also be mounted on the second component group prior to the assembly of the first component group, the second component group and the rolling elements.

Especially in view of a construction of the angle measuring system that is immune to disturbance, the ring of the second component group is implemented as a metallic ring, particularly as a steel ring.

The extension of the first recess may be greater than the extension of the second recess, in each case specific to a direction parallel to the axis. This holds true in particular for, in each instance, the greatest extensions of the second recess.

The electrical conductor may have a cross-section having different outside dimensions, e.g., a rectangular cross-section, that has two different edge lengths as the respective outside dimension. In this context, the larger outside dimension is in a direction parallel to the axis. For example, the same observation may be applied to conductors having an elliptical cross-section, as well.

The first recess may be formed such that the printed circuit board may be introduced into the first recess in the radial direction, especially in a direction toward the axis. In particular, the first recess then has an opening at the outer circumference of the ring of the second component group. Furthermore, the third recess may be formed such that the sensor may be introduced into the third recess in a direction leading away from the axis, radially to the outside. Accordingly, the third recess may have an opening at the inner circumference of the ring of the second component group.

Further features and aspects of example embodiments of the angle measuring system and the method are described below with reference to the attached figures.

DETAILED DESCRIPTION

Figure 1:
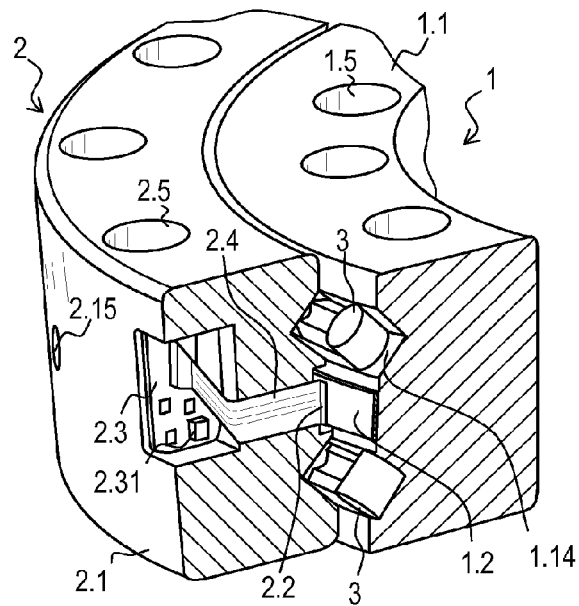
FIG. 1 is a partial cross-sectional view through an angle measuring system.

According to FIG. 1, the angle measuring system of an example embodiment of the present invention includes a first component group 1 and a second component group 2, in the exemplary embodiment presented, first component group 1 being used as a rotor and second component group 2 being used as a stator. First component group 1 includes a ring which, in the present exemplary embodiment, is designated as inner ring 1.1. Correspondingly, a further ring, which is assigned to second component group 2, is designated here as outer ring 2.1.

In the method for producing an angle measuring system, first of all, inner ring 1.1 and outer ring 2.1 are fabricated. In so doing, in the beginning, the contours are brought out comparatively roughly by metal cutting. Axial outside dimension Z (see FIG. 4b) of outer ring 2.1 is 70 mm in the present exemplary embodiment. Furthermore, a radially aligned opening 2.15, here in the form of a cylindrical bore hole, is introduced into outer ring 2.1. Axial extension z of opening 2.15, that is, the diameter of the bore hole is 10 mm here, so that a ratio of z/Z=1/7 is thus obtained. In addition, in this manufacturing phase, a cavity which includes three chambers, i.e., three recesses 2.11, 2.12. 2.13, is introduced into outer ring 2.1. In this context, radially outermost recess 2.11 has the greatest volume. Recess 2.12 situated further inside connects the two adjacent recesses 2.11 and 2.13.

In a further operation, in each case, finely machined running surfaces 1.14, 2.14 are produced on inner ring 1.1 and outer ring 2.1 by a lapping process.

In the course of the further assembly, first of all a sensor 2.2, e.g., an MR sensor, together with an electrical conductor 2.4, here a flexible conductor, are then mounted in outer ring 2.1. Electrical conductor 2.4 has a rectangular cross-section, and therefore has different outside dimensions B, d. Thickness d is relatively small in relation to width B. During assembly, electrical conductor 2.4 is introduced from the inner side of outer ring 2.1 into third recess 2.13, with larger outside dimension B of electrical conductor 2.4 being in a direction parallel to axis A. After that, sensor 2.2 and electrical conductor 2.4 are moved radially outwardly until sensor 2.2 is positioned in third recess 2.13, and electrical conductor 2.4 projects through second recess 2.12 into first recess 2.11. Accordingly, third recess 2.13 is thus provided such that sensor 2.2 may be inserted into recess 2.11 in a direction leading away from axis A.

Next, the end of electrical conductor 2.4 is pulled radially outwardly, so that it is outside of outer ring 2.1. In this position, this end of electrical conductor 2.4 is then connected to an electric coupling 2.32 on a printed circuit board 2.3. A plurality of electronic components is situated on printed circuit board 2.3, among others, one having an electronic circuit 2.31 for evaluating signals of sensor 2.2.

First recess 2.11 is open radially to the outside, thus, is configured so that printed circuit board 2.3 may be introduced into recess 2.11 in a direction toward axis A. Printed circuit board 2.3 is thus inserted into first recess 2.11 accordingly, and is then fixed in position in first recess 2.11. In so doing, printed circuit board 2.3 is oriented such that it is aligned parallel to axis A, thus, the plane of printed circuit board 2.3 is parallel to axis A.

In addition, a graduation ring 1.2 is mounted on the outer circumference of inner ring 1.1. This graduation ring 1.2 is made of a magnetically hard material, here an iron-cobalt-chromium alloy having a coercive field strength of approximately 38 kA/m. In this phase, graduation ring 1.2 has no angle scaling 1.21, i.e., no graduation pattern.

After that, inner ring 1.1 together with graduation ring 1.2 and outer ring 2.1 as well as rolling elements 3 are assembled such that rolling elements 3 are situated between both running surfaces 1.14, 2.14. As a result of the geometric dimensions of inner ring 1.1, of rolling elements 3 and of outer ring 2.1, a radial and axial prestress is produced between inner ring 1.1 and outer ring 2.1. Thus, a system is produced in which first component group 1 is rotatable about an axis A relative to second component group 2, component groups 1, 2 being disposed so as to be axially and radially free from play with respect to each other due to the axial and radial prestress.

Because printed circuit board 2.3 having electronic circuit 2.31 in first recess 2.11 is surrounded by solid outer ring 2.1, optimal protection is provided against electromagnetic disturbances. The same holds true for electrical conductor 2.4 in second recess 2.12 and for sensor 2.2 in third recess 2.13, as well. In this connection, it should be noted that due to the precise fabrication of outer ring 2.1, of rolling elements 3 and of inner ring 1.1, a minimal gap is achieved between outer ring 2.1 and inner ring 1.1, which takes effect positively in terms of immunity to electromagnetic disturbances. To further increase the immunity to electromagnetic disturbances, first recess 2.11 may be closed on the outside by a cover, especially by a metal cover. Furthermore, first recess 2.11, and possibly also second and third recesses 2.12, 2.13, may be filled with a suitable potting material. For example, a cable outlet may be realized through a bore hole in the cover for the electrical connection between the angle measuring system and sequential electronics.

Figure 2:
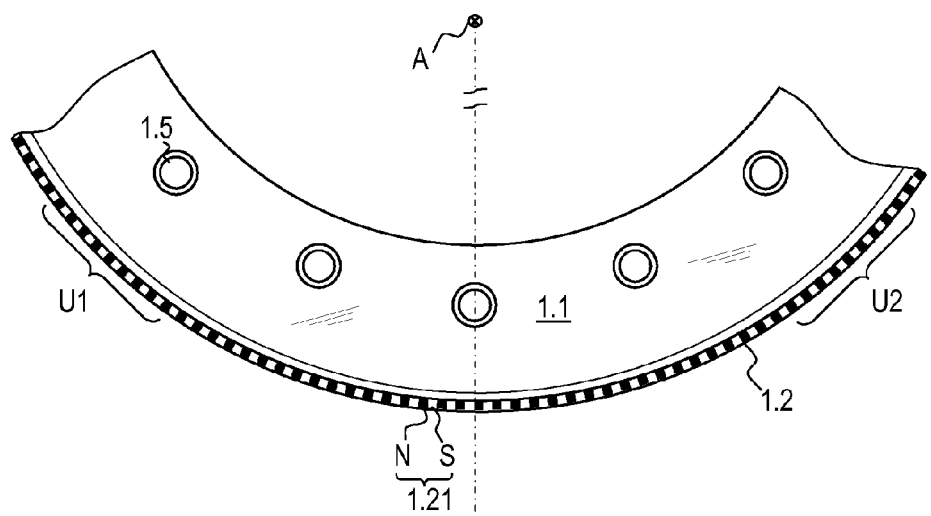
FIG. 2 is a part-top view of a ring of the angle measuring system having an angle scaling.
Figure 3:
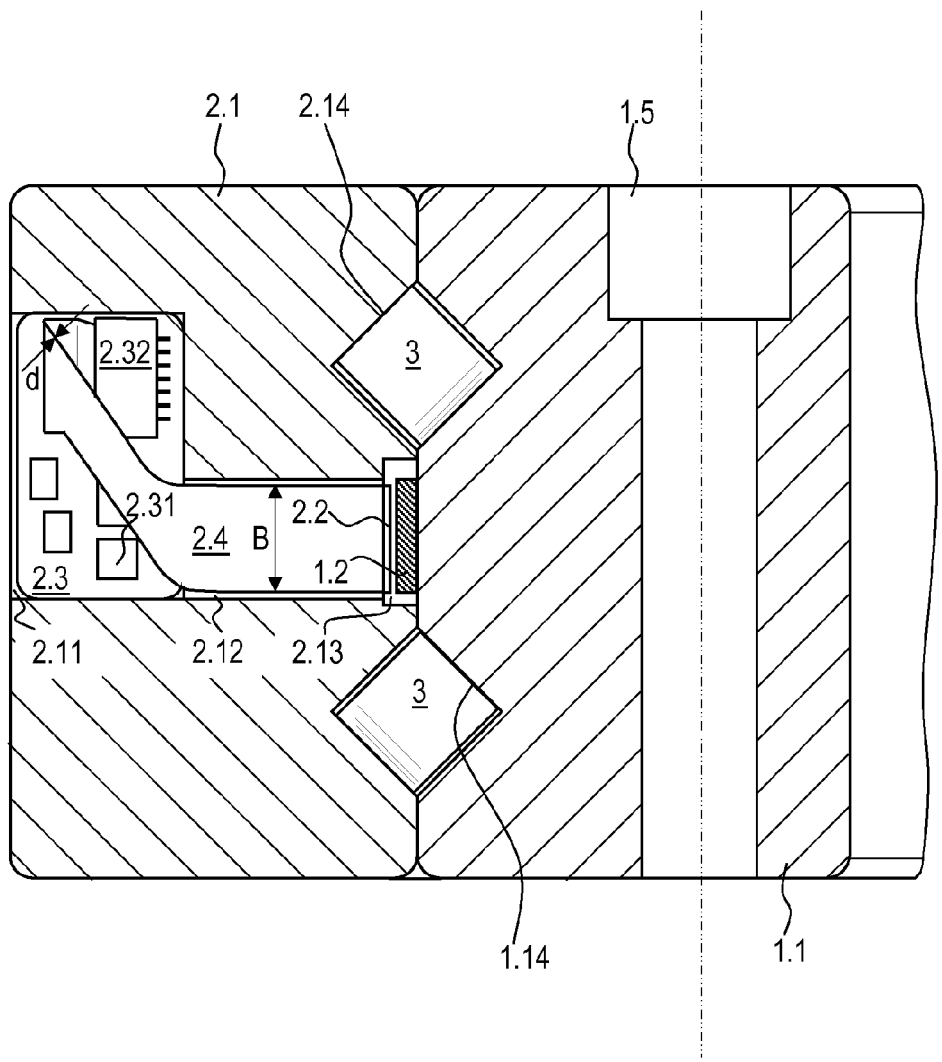
FIG. 3 is a cross-sectional view through the angle measuring system.

The unit assembled to this point is secured to a scaling machine. The scaling machine is used to apply an angle scaling 1.21 (FIG. 2) to graduation ring 1.2. The scaling machine includes a shaft and a stator block, to which a magnetic writing head is attached. The stator block and the shaft are rotatable relative to each other using an air bearing. The scaling machine also includes an extremely exact angular-position measuring device, which is used to precisely determine the angular position of the shaft relative to the stator block.

Prior to applying angle scaling 1.21, inner ring 1.1 is first secured in rotatably fixed manner to the shaft of the scaling machine. In the same manner, outer ring 2.1 is also affixed to the stator block. In this mounting state, a rotation of the shaft consequently brings about a rotation of inner ring 1.1, and therefore of graduation ring 1.2, as well.

After that, the magnetic writing head is inserted into opening 2.15. Angle scaling 1.21, made up of a plurality of magnetic (not visible) graduation marks, is thereupon applied directly onto the lateral side of graduation ring 1.2. In so doing, graduation marks substantially parallel with respect to axis A are produced step-by-step as angle scaling 1.21 on the mantle side by suitable energizing of the writing head, north and south poles alternating with each other along the periphery. Each graduation mark is radially polarized. In the exemplary embodiment presented, the distance between the centers of the graduation marks in the circumferential direction is 200 μm. After each graduation mark is produced on the lateral side of graduation ring 1.2, the shaft is further turned by a minimal amount, thereby permitting the next graduation mark to be applied. Thus, between the respective magnetizing steps, graduation ring 1.2 is further swiveled about axis A, controlled by the angular-position measuring device of the scaling machine. Despite the exceedingly precise production of inner ring 1.1, outer ring 2.1 and rolling elements 3, the system may still exhibit deviations from its ideal geometry.

Accordingly, radial runouts lead to different geometric patterns of angle scaling 1.21 in the circumferential direction, because angle scaling 1.21 is applied on graduation ring 1.2 in an add-on situation which corresponds to the final mounting, and in addition, the system is radially and axially prestressed. Thus, due to the indicated radial runouts, e.g., an eccentricity or a wobble error, the geometric pattern of angle scaling 1.21 in region U1 may differ from the pattern in region U2, and specifically, as a function of the radial runout existing locally at the respective circumferential points. As a result, different patterns may be characterized by different spacings of the graduation marks or by different inclinations of the graduation marks relative to axis A. Because of the high degree of precision, these differences in the patterns of individual regions are comparatively small. Nevertheless, they contribute to the increase in the measuring accuracy of the angle measuring system.

After angle scaling 1.21 is applied, the unit preassembled to this point, made up of first and second component groups 1, 2, may be detached from the scaling machine.

Due to the exceedingly high mechanical stiffness of the angle measuring system, the measuring result is improved on one hand because of the minimal gap between outer ring 2.1 and inner ring 1.1; on the other hand, a small and always constant scanning distance between sensor 2.2 and graduation ring 1.2 may be realized in this manner, as well, thereby making it possible to achieve an increased signal quality. Only by these measures is it possible to read magnetic angle scalings 1.21, which have distances between the centers of the graduation marks in the circumferential direction of less than 300 μm, e.g., less than 250 μm or less than 200 μm, with high resolution.

Figure 4A:
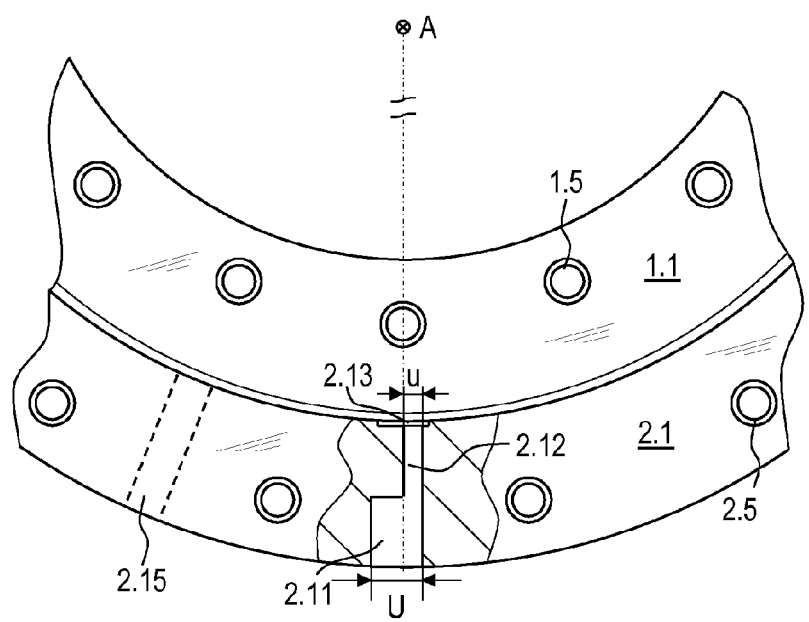
FIG. 4a is a top view of a part of the angle measuring system.
Figure 4B:
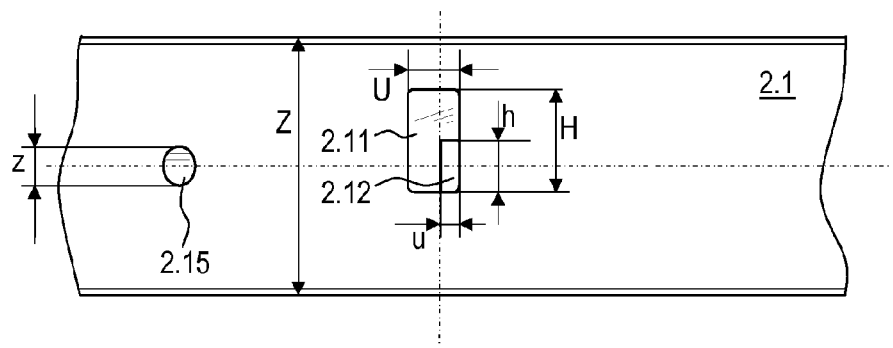
FIG. 4b is a side view of a partial area of the angle measuring system.

The special form of recesses 2.11, 2.12, 2.13 and of opening 2.15, as shown in FIGS. 4a and 4b, contributes substantially to the achievement of the high mechanical stiffness of the angle measuring system. First of all, opening 2.15 is dimensioned such that its extension z is comparatively small relative to axial extension Z of outer ring 2.1. In addition, first and second recesses 2.11, 2.12 are formed so that their respective extensions in the circumferential direction U, u are smaller than their axial extensions H, h, thus U<H, u<h. In particular, first recess 2.11 of the outer ring has its greatest extension H in a direction parallel to axis A. Moreover, outer ring 2.1 is dimensioned such that extension H of first recess 2.11 is greater than extension h of second recess 2.12 (H>h), in each instance, specific to a direction parallel to axis A. In addition, extension U of first recess 2.11 is greater than extension u of second recess 2.12 (U>u), in each case specific to the circumferential direction.

The angle measuring system represents an autonomous unit which a user is able to mount easily on a shaft to be measured, but which supplies exceedingly exact angular positions. Because of the extremely precise arrangement of the angle measuring system, it is possible to dispense with an alignment coupling.

During operation of the angle measuring system, sensor 2.2 supplies position-dependent currents or voltages, corresponding to the poles of angle scaling 1.21 facing opposite sensor 2.2. These currents or voltages are processed in electronic circuit 2.31 and ultimately digitized. The digital signals may then be passed on by the angle measuring system to sequential electronics, the digitizing permitting a data transmission largely immune to disturbances.

Moreover, due to the integrated type of construction, the angle measuring system is very compact in its outside dimensions, and in particular, has an extremely small maximum axial extension Z. In the exemplary embodiment shown, axial extension Z amounts to only approximately 25% of the maximum outside radius. In addition, due to the type of construction described, a high-quality angle measuring system is provided which is suitable for large diameters of shafts to be measured. Thus, the angle measuring system has an opening to this effect, whose inside radius comes to approximately 66% of the maximum outside radius.

What is claimed is:

1. An angle measuring system, comprising:
    a first component group including a first ring having a first running surface and an angle scaling;
    a second component group including a second ring having a second running surface and a sensor adapted to scan the angle scaling;
    rolling elements disposed between the first running surface and the second running surface;
    wherein the first component group is rotatable about an axis relative to the second component group;
    wherein a geometric pattern of the angle scaling in a first region differs from a geometric pattern of the angle scaling in a second region as a function of radial runouts of at least one of (a) the running surfaces and (b) the rolling elements; and
    wherein the second ring includes a radially traversing opening through which the angle scaling is applicable.

2. The angle measuring system according to claim 1, wherein the angle scaling is aligned with a directional component parallel to the axis.

3. The angle measuring system according to claim 1, wherein the first component group and the second component group are arranged axially free from play with respect to each other.

4. The angle measuring system according to claim 1, wherein each of the first component group and the second component group has two running surfaces, the rolling elements disposed between the running surfaces, the angle scaling and an opening through which the angle scaling is applicable arranged axially between the running surfaces.

5. The angle measuring system according to claim 1, wherein the geometric pattern of the angle scaling includes regions having different magnetic polarization.

6. The angle measuring system according to claim 5, wherein the sensor includes at least one of (a) an MR sensor and (b) a Hall sensor.

7. The angle measuring system according to claim 5, wherein the angle scaling is applied on a component of the first component group that is formed of a magnetically hard material.

8. The angle measuring system according to claim 1, wherein the second ring includes a recess adapted to accommodate an electrical conductor that electrically connects the sensor to an electronic circuit set apart from the sensor.

9. A method for producing an angle measuring system including a first component group and a second component group, the first component group rotatable about an axis relative to the second component group, the first component group having a first ring, the second component group having a second ring and a sensor, comprising:
    fabricating the rings including producing at least one finely machined running surface on each ring;

assembling the angle measuring system such that the running surface of the first ring is situated opposite the running surface of the second ring, such that rolling elements are located between both running surfaces, and such that the first component group and the second component group are axially free from play with respect to each other;

affixing the rings to components of a scaling machine that are rotatable relative to each other; and applying an angle scaling to a component of the first component group, including rotating the rings in the scaling machine relative to each other about the axis;

wherein the fabricating includes forming an opening in the second ring, and wherein the angle scaling is applied in the applying to the component of the first component group via the opening.

10. The method according to claim 9, wherein the applying includes inserting a magnetic writing head into the opening and applying the angle scaling by the magnetic writing head including regions having different magnetic polarization.

11. The method according to claim 9, wherein the component of the first component group on which angle scaling is applied is formed of a magnetically hard material.

12. The method according to claim 9, wherein the assembly includes mounting the component of the first component group on which the angle scaling is applied on the ring of the first component group prior to the applying of the angle scaling.

13. The method according to claim 9, wherein the assembling includes producing at least one of (a) a radial prestress and (b) an axial prestress between the rings.

14. The method according to claim 9, wherein the assembling includes mounting a sensor on the second component group.

15. The method according to claim 9, wherein the angle scaling is applied with a directional component parallel to the axis.

16. The method according to claim 9, further comprising machining the running surfaces by at least one of (a) a grinding, (b) a honing, and (c) a lapping process.

* * * * *